US012617443B2

(12) United States Patent (10) Patent No.: US 12,617,443 B2

Luo (45) Date of Patent: May 5, 2026

(54) MANNED FOLDING PEDAL OF OUTDOOR FOLDABLE ELECTRIC TRAILER

(71) Applicant: Shenzhen Chepinyi Technology Co., Ltd., Guangdong (CN)

(72) Inventor: Haicheng Luo, Guangdong (CN)

(73) Assignee: Shenzhen Chepinyi Technology Co., Ltd., Shenzhen (CN)

( * ) Notice: Subject to any disclaimer, the term of this patent is extended or adjusted under 35 U.S.C. 154(b) by 323 days.

(21) Appl. No.: 18/380,699

(22) Filed: Oct. 17, 2023

(65) Prior Publication Data

US 2024/0174278 A1 May 30, 2024

(30) Foreign Application Priority Data

Nov. 28, 2022 (CN) .......................... 202223168040.6

(51) Int. Cl.
*B62B 3/02* (2006.01)
*B62B 5/06* (2006.01)

(52) U.S. Cl.
CPC ................ *B62B 3/025* (2013.01); *B62B 5/06* (2013.01)

(58) Field of Classification Search
CPC .......... B62B 3/025; B62B 3/027; B62B 3/02; B62B 3/007; B62B 5/06; B62B 5/064; B62B 5/0026; B62B 5/004; B62B 5/0043; B62B 5/0046
See application file for complete search history.

(56) References Cited

U.S. PATENT DOCUMENTS

| | | | | |
|---|---|---|---|---|
| 7,762,363 B1 * | 7/2010 | Hirschfeld | ............... | B60K 1/04 |
| | | | | 280/651 |
| 8,286,739 B2 * | 10/2012 | Oliphant | ............... | H01M 10/44 |
| | | | | 180/65.1 |

FOREIGN PATENT DOCUMENTS

| | | | | | |
|---|---|---|---|---|---|
| CN | 108177719 | A | * | 6/2018 | ........... B62K 15/008 |
| CN | 112455584 | A | * | 3/2021 | ............... B62K 5/01 |
| KR | 102324477 | B1 | * | 11/2021 | ............. B62B 5/087 |
| KR | 20220059097 | A | * | 5/2022 | ............. B62B 3/001 |

OTHER PUBLICATIONS

Machine translation of CN 108177719-A. (Year: 2018).*

* cited by examiner

*Primary Examiner* — John D Walters

(57) ABSTRACT

Disclosed is a manned folding pedal of an outdoor folding electric trailer, including a folding frame, where a power wheel is mounted at the bottom of one end of the folding frame, a control rod is mounted above one end of the frame far away from the power wheel, a folding pedal assembly is rotatably arranged below one end of the vehicle frame provided with the control rod, and the folding pedal assembly is movably connected with a universal wheel assembly. Manned use of the electric trailer is achieved through the folding pedal assembly, and the use experience of a user is improved. Fixing of the folding pedal assembly is achieved, and normal motion of the electric trailer is not affected due to the movable arrangement of the universal wheel assembly, thus improving the practicability and convenience of the electric trailer.

7 Claims, 6 Drawing Sheets

MANNED FOLDING PEDAL OF OUTDOOR FOLDABLE ELECTRIC TRAILER

CROSS REFERENCE TO RELATED APPLICATIONS

The present application claims the benefit of Chinese Patent Application No. 202223168040.6 filed on Nov. 28, 2022, the contents of which are incorporated herein by reference in their entirety.

TECHNICAL FIELD

The present invention relates to the technical field of camping vehicles, and particularly relates to a manned folding pedal of an outdoor foldable electric trailer.

BACKGROUND

Carts for outdoor activities, also known as camp trailers, camping trailers, camper trailers, etc., are usually used to transport outdoor equipment (such as energy storage power supplies, outdoor refrigerators, tents, catering equipment, food, communication equipment, etc.) from indoors or vehicles to event destinations during outdoor activities. The design of a folding structure of vehicle body enables convenient unfolding, storage and transportation without taking up too much storage space. Existing outdoor trailers cannot carry people, and need to be dragged by manpower or electric power, or pushed to move. Also, the user needs to control the distance from the trailer to avoid collisions. In particular, collisions between the trailer and the user are very likely to occur due to fast speeds of moving on downhill roads. The user will feel tired after walking for a long time and a long distance, which will affect the use effect and bring a bad experience to the user.

Therefore, it is urgent to design a manned folding pedal of an outdoor foldable electric trailer to overcome the above one or more deficiencies in the prior art.

SUMMARY

The technical solution adopted by the present invention to achieve the above technical purpose is as follows: a manned folding pedal of an outdoor foldable electric trailer, including a folding frame, where a power wheel is mounted at the bottom of one end of the folding frame, a control rod is mounted above one end of the frame far away from the power wheel, a folding pedal assembly is rotatably arranged below one end of the vehicle frame provided with the control rod, and the folding pedal assembly is movably connected with a universal wheel assembly.

In a preferred embodiment, the folding pedal assembly includes: a first pedal and a second pedal; the first pedal is hinged with one end of and the second pedal, the bottom surface of the first pedal is provided with a connecting rod locking assembly, a rotating groove is formed respectively on the two sides of an end of the second pedal away from the first pedal, and the universal wheel assembly is movably arranged in the rotating groove.

In a preferred embodiment, the connecting rod locking assembly includes: a retractable switch column, where the head end of the retractable switch column penetrates one side of the first pedal, a switch spring is connected to the tail end of the retractable switch column, an end of the switch spring far away from the retractable switch column is connected to the bottom surface of the first pedal, a main connecting rod is rotatably connected to the tail end of the retractable switch column, the middle part of the main connecting rod is rotatably connected to the bottom surface of the first pedal, one end of the main connecting rod away from the retractable switch column is rotatably connected to a left first connecting rod, one end of the left first connecting rod away from the main connecting rod is rotatably connected with a left second connecting rod, the middle part of the left second connecting rod is rotatably connected with the bottom surface of the first pedal, one end of the left second connecting rod away from the left first connecting rod is rotatably connected with a left latch rod, one end of the left latch rod far away from the left second connecting rod penetrates the side wall of the first pedal, one end of the left latch rod penetrating the first pedal is further fixedly provided with a left push plate, and the left push plate is located in the bottom surface of the first pedal.

In a preferred embodiment, the connecting rod locking assembly further includes: a right first connecting rod, where the first end of the right first connecting rod is rotatably connected to an end of the main connecting rod adjacent to the switch spring, the tail end of the right first connecting rod is rotatably connected to a right second connecting rod, the middle part of the right second connecting rod is rotatably connected to the bottom surface of the first pedal, an end of the right second connecting rod away from the right first connecting rod is rotatably connected to a right latch rod, an end of the right latch rod away from the right second connecting rod penetrates the side wall of the first pedal, an end of the right latch rod penetrating the side wall of the first pedal is connected with a right push plate, and the right push plate is located in the bottom surface of the first pedal.

In a preferred embodiment, a retraction bayonet is arranged respectively on both sides of an end of the second pedal away from the first pedal, the end portion of the retraction bayonet penetrates the side wall of the second pedal, one end of the retraction bayonet located in the second pedal is connected to a bayonet spring, one end of the retraction bayonet provided with the bayonet spring is further connected to a toggle plate, and the toggle plate is spaced apart from the end connected to the retraction bayonet and the inner side wall of the second pedal.

In a preferred embodiment, the universal wheel assembly includes: two universal wheels, where the two universal wheels are rotatably connected with the two rotating grooves one by one, a synchronization rod is fixedly connected between the two universal wheels, a first push-pull rod is rotatably connected in the middle of the synchronization rod, a push-pull chute is arranged in the middle of the bottom surface of the second pedal, an end of the first push-pull rod away from the synchronization rod is slidably connected with the push-pull chute, a linkage chute is arranged at one end where the first push-pull rod is connected to the push-pull chute, the bottom surface of one end where the first pedal is connected to the second pedal is rotatably connected with a second push-pull rod, and an end of the second push-pull rod far away from the first pedal is slidably connected with the linkage chute.

In a preferred embodiment, a limiting plate is arranged respectively on both sides of one end of the vehicle frame provided with the folding pedal assembly, a first retractable limiting hole is formed on the top of the limiting plate, an unfoldable limiting hole is formed at the bottom of the limiting plate, the angle between the first retractable limiting hole and the unfoldable limiting hole is set to be 90°, and a second retractable limiting hole is further formed on the limiting plate.

The beneficial effects of the present invention are as follows: manned use of the electric trailer is achieved through the folding pedal assembly, and the use experience of a user is improved. In addition, fixing of the folding pedal assembly is achieved through a connecting rod locking assembly, and normal motion of the electric trailer is not affected by folding or unfolding of the folding pedal assembly due to the movable arrangement of the universal wheel assembly, thus improving the practicability and convenience of the electric trailer.

10, folding frame; 101, power wheel; 102, control rod; 103, limiting plate; 104, first retractable limiting hole; 105, second retractable limiting hole; 106, unfoldable limiting hole; 11, folding pedal assembly; 111, first pedal; 112, second pedal; 113, rotating groove; 114, retraction bayonet; 115, bayonet spring; 116, toggle plate; 12, connecting rod locking assembly; 121, retractable switch column; 122, switch spring; 123, main connecting rod; 124, left first connecting rod; 125, left second connecting rod; 127, left latch rod; 128, left push plate; 129, right first connecting rod; 130, right second connecting rod; 131, right latch rod; 132, right push plate; 14, universal wheel assembly; 141, universal wheel; 142, synchronization rod; 143, first push-pull rod; 144, push-pull chute; 145, linkage chute; 146, second push-pull rod.

DETAILED DESCRIPTION OF THE EMBODIMENTS

In order to enable the objectives, features, and advantages mentioned above of the present invention to be more apparent and easily understood, specific implementations of the present invention will be described in detail below with reference to the drawings. Numerous specific details are set forth in the following description to facilitate a thorough understanding of the present invention. However, the present invention can be implemented in many other ways than those described herein, and those skilled in the art may make similar modifications without departing from the spirit of the present invention, and therefore the present invention is not to be limited by the specific embodiments disclosed below.

Figure 1:
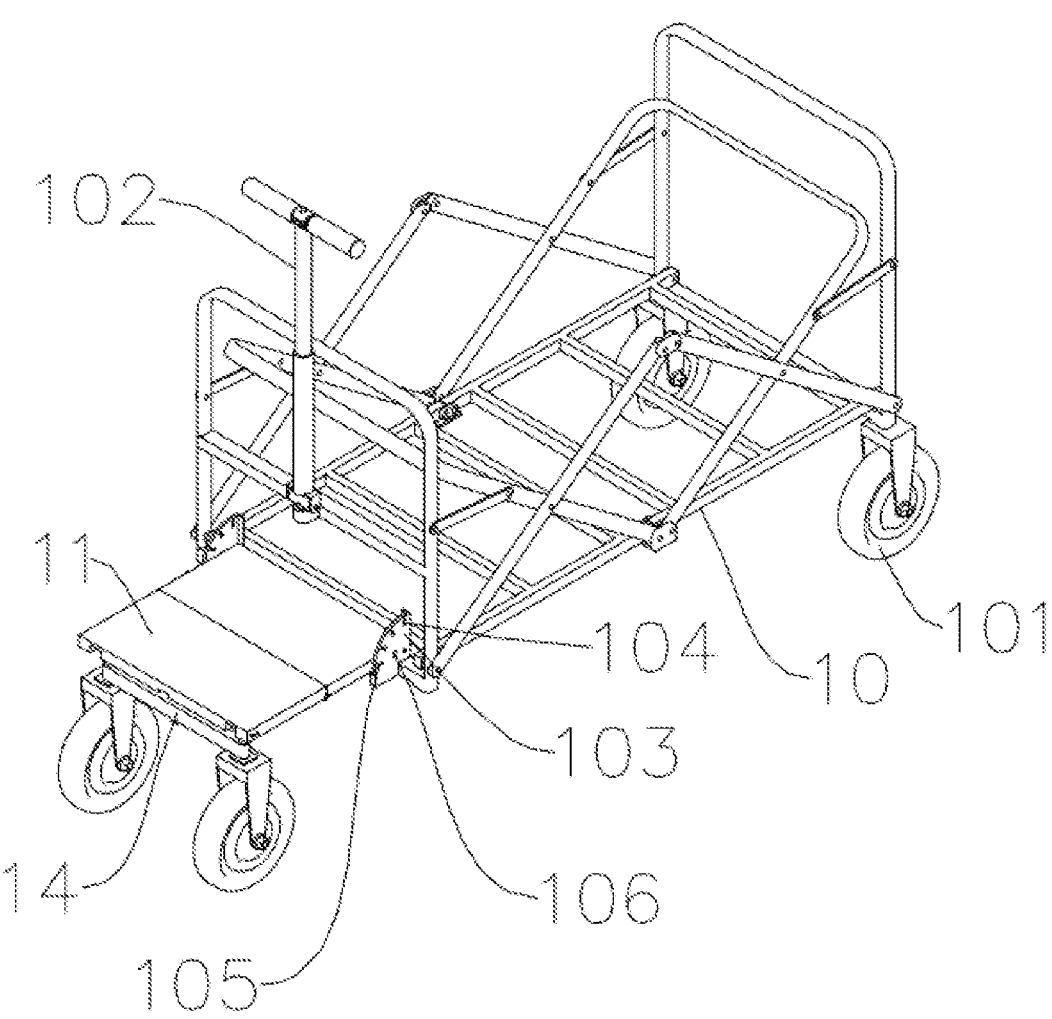
FIG. 1 is a schematic diagram of the structure of the present invention.
Figure 2:
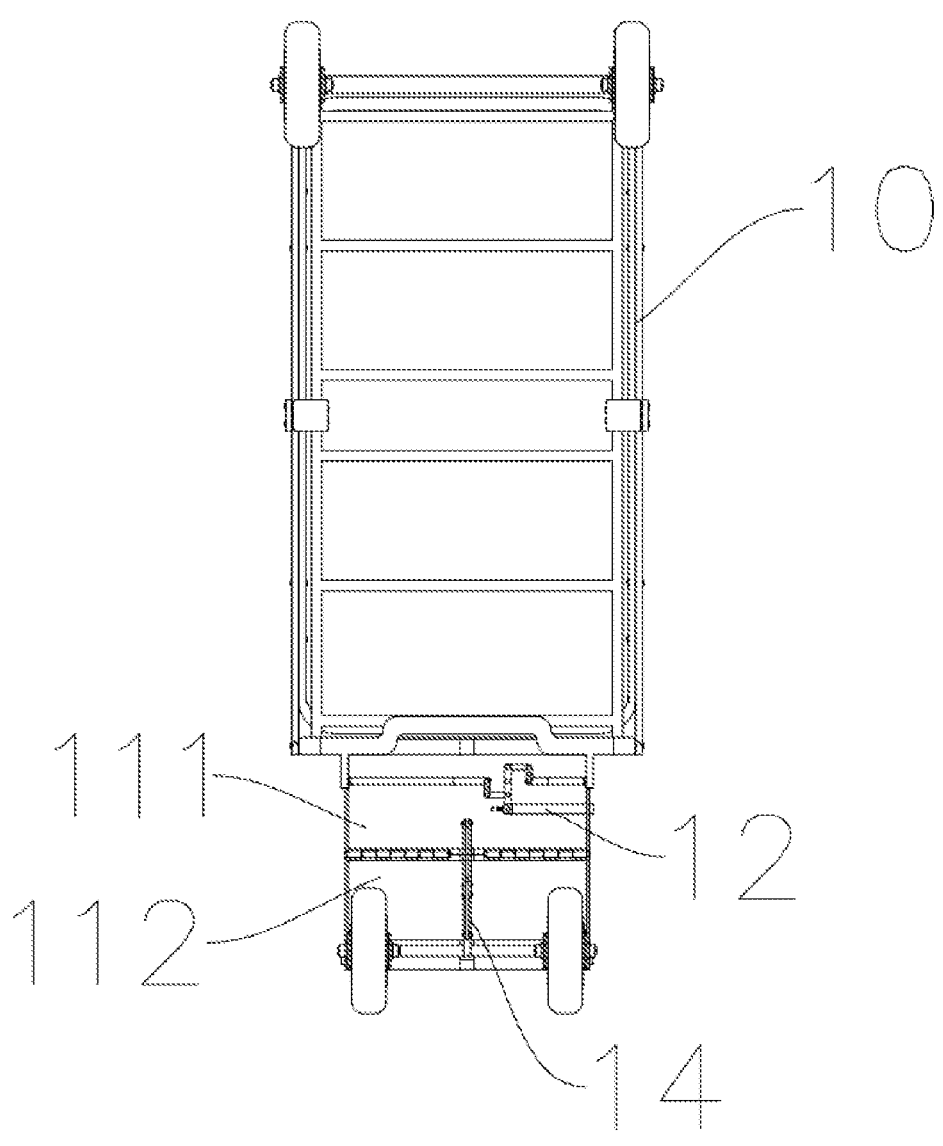
FIG. 2 is a bottom view of the present invention.
Figure 3:
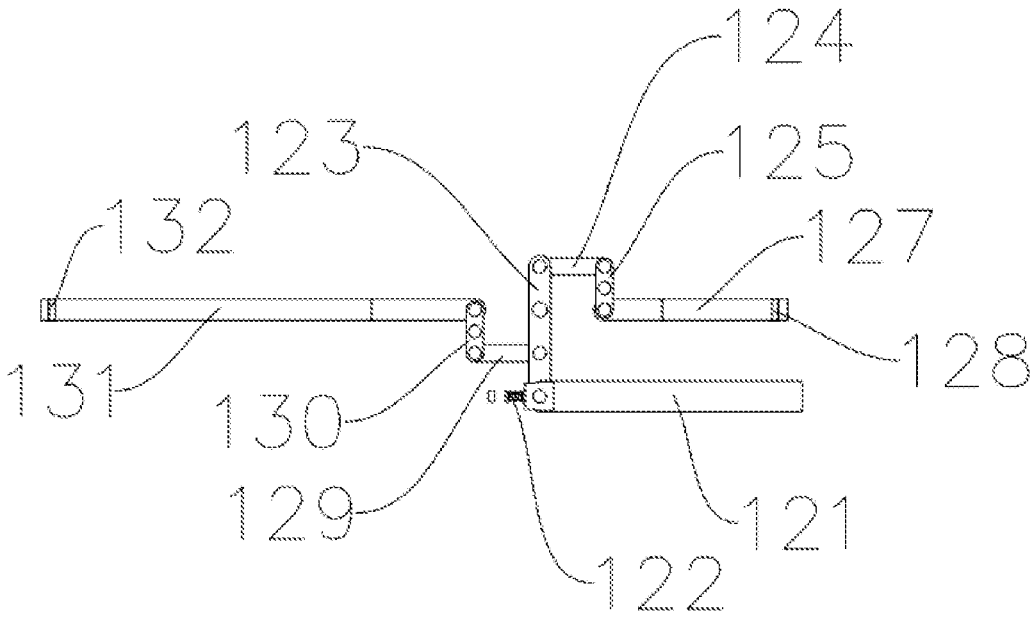
FIG. 3 is a schematic diagram of the structure of a connecting rod locking assembly of the present invention.
Figure 4:
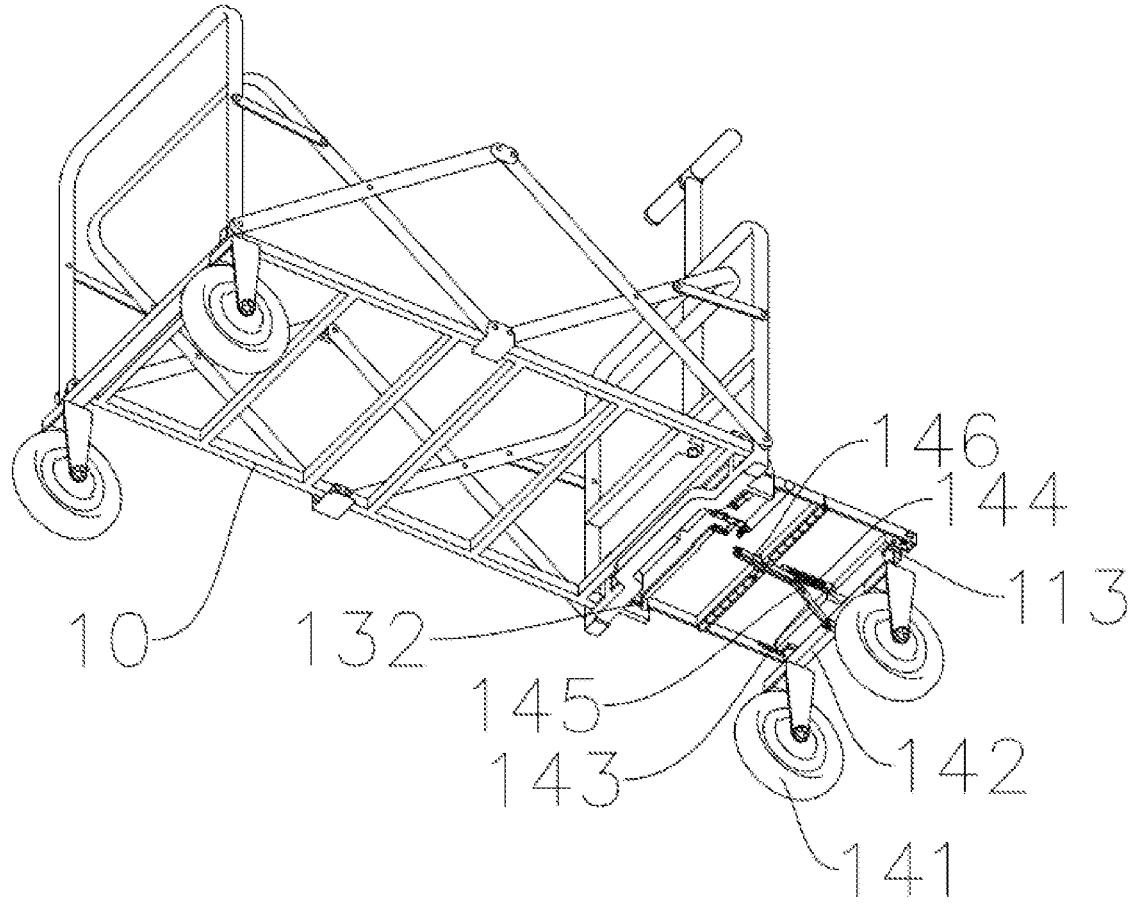
FIG. 4 is a schematic diagram of the structure of a universal wheel assembly of the present invention.
Figure 5:
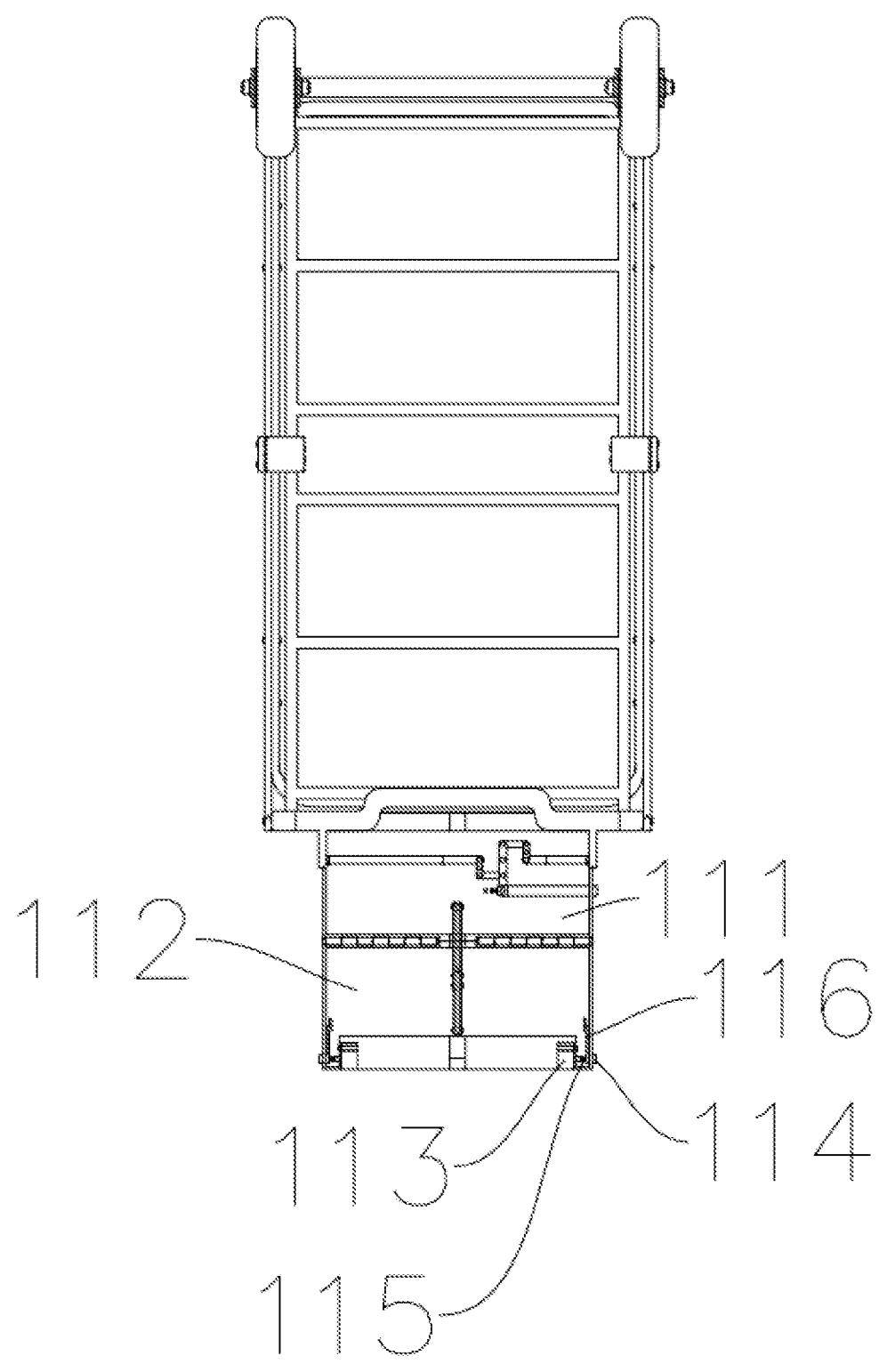
FIG. 5 is a schematic diagram of the structure of a second pedal of the present invention.
Figure 6:
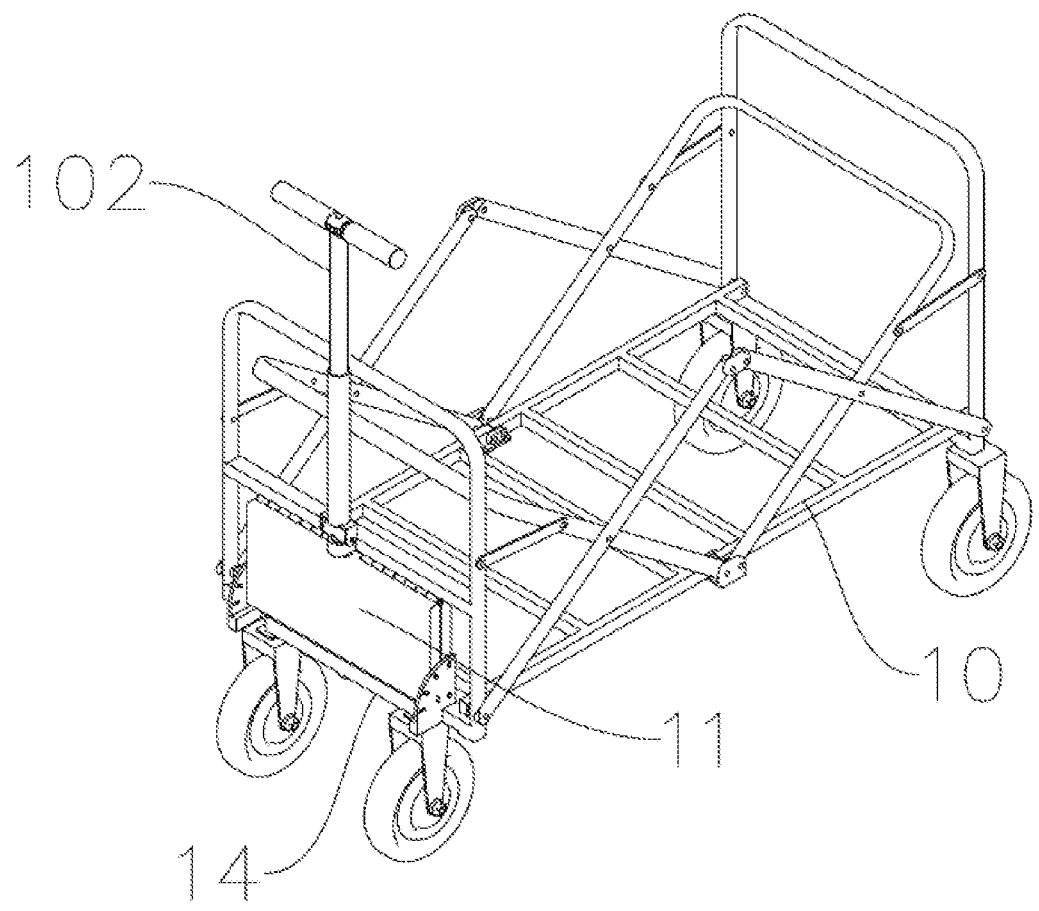
FIG. 6 is a diagram of the folding state of a folding pedal assembly of the present invention.

As shown in FIGS. 1-6, the present invention provides a manned folding pedal of an outdoor folding electric trailer, and the trailer includes a folding frame 10, where a power wheel 101 is mounted at the bottom of one end of the folding frame 10, a control rod 102 is mounted above one end of the frame far away from the power wheel 101, a folding pedal assembly 11 is rotatably arranged below one end of the vehicle frame provided with the control rod 102, and the folding pedal assembly 11 is movably connected with a universal wheel assembly 14. Specifically, the power wheel 101 is configured to drive the vehicle frame to move, the control rod 102 is configured to control the output power of the power wheel 101, and the folding pedal assembly 11 can be unfolded to carry people when needed or folded when not needed. In addition, the control rod 102 can be rotated horizontally on the vehicle frame or rotated vertically relative to the vehicle frame to change the mode of using the control rod 102. If it is necessary to drag the vehicle frame for moving, the control rod can be rotated vertically to facilitate dragging of the vehicle frame for moving.

Further, in this embodiment, the folding pedal assembly 11 includes: a first pedal 111 and a second pedal 112; the first pedal 111 is hinged with one end of and the second pedal 112, the bottom surface of the first pedal 111 is provided with a connecting rod locking assembly 12, a rotating groove 113 is formed respectively on the two sides of an end of the second pedal 112 away from the first pedal 111, and the universal wheel assembly 14 is movably arranged in the rotating groove 113. Specifically, the first pedal 111 and the second pedal 112 are hinged so that the first pedal 111 and the second pedal 112 can be folded or unfolded. The connecting rod locking assembly 12 is arranged on the bottom surface of the first pedal 111 to lock the first pedal 111 and the second pedal 112 in the state of folding or unfolding. The universal wheel assembly 14 is arranged in the rotating groove 113 of the second pedal 112, to change the direction of the universal wheel assembly 14 relative to the second pedal 112 when the universal wheel assembly is not in use, so that even when the folding pedal assembly 11 is folded, it will not affect the moving of the vehicle frame.

Further, in this embodiment, the connecting rod locking assembly 12 includes: a retractable switch column 121, where the head end of the retractable switch column 121 penetrates one side of the first pedal 111, a switch spring 122 is connected to the tail end of the retractable switch column 121, an end of the switch spring 122 far away from the retractable switch column 121 is connected to the bottom surface of the first pedal 111, a main connecting rod 123 is rotatably connected to the tail end of the retractable switch column 121, the middle part of the main connecting rod 123 is rotatably connected to the bottom surface of the first pedal 111, one end of the main connecting rod 123 away from the retractable switch column 121 is rotatably connected to a left first connecting rod 124, one end of the left first connecting rod 124 away from the main connecting rod 123 is rotatably connected with a left second connecting rod 125, the middle part of the left second connecting rod 125 is rotatably connected with the bottom surface of the first pedal 111, one end of the left second connecting rod 125 from the left first connecting rod 124 is rotatably connected with a left latch rod 127, one end of the left latch rod 127 far away from the left second connecting rod 125 penetrates the side wall of the first pedal 111, one end of the left latch rod 127 penetrating the first pedal 111 is further fixedly provided with a left push plate 128, and the left push plate 128 is located in the bottom surface of the first pedal 111. Specifically, when the retractable switch column 121 is pressed, it compresses the switch spring 122 and synchronously pushes the main connecting rod 123 to rotate around its center, driving the left first connecting rod 124 to rotate in a direction away from the retractable the switch column 121. At the same time, the left second connecting rod 125 is driven to rotate toward the direction of the retractable switch column 121 according to the principle of leverage, and the left latch rod 127 is pushed to penetrate the side wall of the first pedal 111. When the retractable switch column 121 loses an external force, under the action of the restoring force of the switch spring 122, the side wall of the first pedal 111 is pushed out, and meanwhile, the main connecting rod 123, the left first connecting rod 124, the left second connecting rod 125, and the left latch rod 127 are driven to move in a reverse direction relative to the aforementioned motion. In addition, the end portion of the left latch rod 127 that penetrates the side wall of the first pedal 111 is retracted, and the left push plate 128 is capable to prevent the left latch rod 127 from excessively penetrating the side wall of the first pedal 111.

Further, in this embodiment, the connecting rod locking assembly 12 further includes: a right first connecting rod 129, where the first end of the right first connecting rod 129 is rotatably connected to an end of the main connecting rod 123 adjacent to the switch spring, the tail end of the right first connecting rod 129 is rotatably connected to a second right connecting rod 130, the middle part of the right second connecting rod 130 is rotatably connected to the bottom surface of the first pedal 111, an end of the right second connecting rod 130 away from the right first connecting rod 129 is rotatably connected to a right latch rod 131, an end of the right latch rod 131 away from the right second connecting rod 130 penetrates the side wall of the first pedal 111, an end of the right latch rod 131 penetrating the side wall of the first pedal 111 is connected with a right push plate 132, and the right push plate 132 is located in the bottom surface of the first pedal 111. Specifically, when the retractable switch column 121 is pressed, the right first connecting rod 129 is pushed by the main connecting rod 123 to move in a direction away from the retractable switch column 121, driving the right second connecting rod 130 to rotate around its center. At the same time, the end portion of the right latch rod 131 is driven to penetrate the side wall of the first pedal 111 according to the principle of leverage. After the retractable switch column 121 loses the force of pressing, under the action of the switch spring 122, the right first connecting rod 129, the right second connecting rod 130, and the right latch rod 131 are driven to move in a reverse direction relative to the aforementioned motion. In addition, the end portion of the right latch rod 131 that penetrates the side wall of the first pedal 111 is retracted, and the right push plate 132 is capable to prevent the right latch rod 131 from excessively penetrating the side wall of the first pedal 111.

Further, in this embodiment, a retraction bayonet 114 is arranged respectively on both sides of an end of the second pedal 112 away from the first pedal 111, the end portion of the retraction bayonet 114 penetrates the side wall of the second pedal 112, one end of the retraction bayonet 114 located in the second pedal 112 is connected to a bayonet spring 115, one end of the retraction bayonet 114 provided with the bayonet spring 115 is further connected to a toggle plate 116, and the toggle plate 116 is spaced apart from the end connected to the retraction bayonet 114 and the inner side wall of the second pedal 112. Specifically, the retraction bayonet 114 is configured to limit the unfolding of the second pedal 112 when the folding pedal assembly 11 is in the storage state. One end of the retraction bayonet 114 penetrates the side wall of the second pedal 112 under the action of the bayonet spring 115. The toggle plate 116 is configured to retract the retraction bayonet 114. When the second pedal 112 and the first pedal 111 are folded and fit, the corresponding left push plate 128 and the right push plate 132 can be respectively inserted into the gap between the toggle plate 116 and the side wall of the second pedal 112, and then the left latch rod 127 and the right latch rod 131 are respectively moved towards the center of the first pedal 111 by pressing the retractable switch. At the same time, the toggle plate 116 is pushed synchronously, so that the toggle plate 116 squeezes the bayonet spring 115, and retracts the retraction bayonet 114 into the side wall of the second pedal 112. When the retractable switch column 121 loses the force of pressing, the end portions of the left latch rod 127 and the right latch rod 131 penetrate the side wall of the first pedal 111 respectively, and at the same time, the toggle plate 116 loses the acting force of the left push plate 128 and the right push plate 132, and under the action of the restoring force of the bayonet spring 115, the end portion of the retraction bayonet 114 is pushed out of the side wall of the second pedal 112.

Further, in this embodiment, the universal wheel assembly 14 includes: two universal wheels 141, where the two universal wheels 141 are rotatably connected with the two rotating grooves 113 one by one, a synchronization rod 142 is fixedly connected between the two universal wheels 141, a first push-pull rod 143 is rotatably connected in the middle of the synchronization rod 142, a push-pull chute 144 is arranged in the middle of the bottom surface of the second pedal 112, an end of the first push-pull rod 143 away from the synchronization rod 142 is slidably connected with the push-pull chute 144, a linkage chute 145 is arranged at one end where the first push-pull rod 143 is connected to the push-pull chute 144, the bottom surface of one end where the first pedal 111 is connected to the second pedal 112 is rotatably connected with a second push-pull rod 146, and an end of the second push-pull rod 146 far away from the first pedal 111 is slidably connected with the linkage chute 145. Specifically, when the first pedal 111 and the second pedal 112 are folded, due to the folding of the second pedal 112, the second push-pull rod 146 slides in the linkage chute 145. When the second push-pull rod 146 slides to the limit distance, the first push-pull rod 143 is pushed to slide in the push-pull chute 144, and the synchronization rod 142 is pushed to rotate relative to the second pedal 112 at the same time until the two universal wheels 141 are synchronously accommodated in the rotating groove 113. At this time, the second pedal 112 is vertical, and the two universal wheels 141 and the second pedal 112 are on the same vertical plane, so that even if the folding pedal assembly 11 is in the storage state, the motion of the vehicle frame will not be affected. When the folding pedal assembly 11 is unfolded, the second push-pull rod 146 slides in the linkage chute 145 until it reaches the limit distance. At this time, the second push-pull rod 146 pulls the first push-pull rod 143 to slide within the push-pull chute 144 until it reaches the limit distance. Then the first push-pull rod 143 pulls the synchronization rod 142, thus causing the synchronization rod 142 to rotate relative to the second pedal 112, driving the two universal wheels 141 to rotate, and making the two universal wheels 141 perpendicular to the second pedal 112.

Further, in this embodiment, a limiting plate 103 is arranged respectively on both sides of one end of the vehicle frame provided with the folding pedal assembly 11, a first retractable limiting hole 104 is formed on the top of the limiting plate 103, an unfoldable limiting hole 106 is formed at the bottom of the limiting plate 103, the angle between the first retractable limiting hole 104 and the unfoldable limiting hole 106 is set to be 90°, and a second retractable limiting hole 105 is further formed on the limiting plate 103. Specifically, when the folding pedal is in the folding state, one end of the left latch rod penetrating the side wall of the first pedal 111 is inserted into the first retractable limiting hole 104, and at the same time, the retraction bayonet 114 is inserted into the second retractable limiting hole 105, so that the folding pedal is fixed in the folding state. When the folding pedal assembly 11 is in the unfolding state, one end of the left latch rod 127 or the right latch rod 131 that penetrates the side wall of the first pedal 111 is inserted into the unfoldable limiting hole 106, to fix the folding pedal assembly 11 in the folding state.

To sum up, manned use of the electric trailer is achieved through the folding pedal assembly 11, and the use experience of a user is improved. In addition, fixing of the folding pedal assembly 11 is achieved through a connecting rod locking assembly 12, and normal motion of the electric trailer is not affected by folding or unfolding of the folding pedal assembly 11 due to the movable arrangement of the universal wheel assembly 14, thus improving the practicability and convenience of the electric trailer.

The present invention is not limited merely to what is described in the specification and the implementation modes, such that additional advantages and modifications can be readily achieved by those skilled in the art. Without departing from the spirit and scope of the general concept as defined by the claims and the equivalents, the present invention is not limited to the specific details, representative apparatus, and illustrative examples as shown and described herein.

The invention claimed is:

1. A manned folding pedal of an outdoor foldable electric trailer, comprising a folding frame, wherein a power wheel is mounted at a bottom of a first end of the folding frame, a control rod is mounted above a second end of the folding frame, the second end being opposite the first end where the power wheel is located, a folding pedal assembly is rotatably arranged below the second end of the folding frame provided with the control rod, and the folding pedal assembly is movably connected with a universal wheel assembly.

2. The manned folding pedal of an outdoor foldable electric trailer according to claim 1, wherein the folding pedal assembly comprises: a first pedal and a second pedal; the first pedal is hinged with one end of and the second pedal, the bottom surface of the first pedal is provided with a connecting rod locking assembly, a rotating groove is formed respectively on the two sides of an end of the second pedal away from the first pedal, and the universal wheel assembly is movably arranged in the rotating groove.

3. The manned folding pedal of an outdoor foldable electric trailer according to claim 2, wherein the connecting rod locking assembly comprises: a retractable switch column, wherein the head end of the retractable switch column penetrates one side of the first pedal, a switch spring is connected to the tail end of the retractable switch column, an end of the switch spring far away from the retractable switch column is connected to the bottom surface of the first pedal, a main connecting rod is rotatably connected to the tail end of the retractable switch column, the middle part of the main connecting rod is rotatably connected to the bottom surface of the first pedal, one end of the main connecting rod away from the retractable switch column is rotatably connected to a left first connecting rod, one end of the left first connecting rod away from the main connecting rod is rotatably connected with a left second connecting rod, the middle part of the left second connecting rod is rotatably connected with the bottom surface of the first pedal, one end of the left second connecting rod away from the left first connecting rod is rotatably connected with a left latch rod, one end of the left latch rod far away from the left second connecting rod penetrates the side wall of the first pedal, one end of the left latch rod penetrating the first pedal is further fixedly provided with a left push plate, and the left push plate is located in the bottom surface of the first pedal.

4. The manned folding pedal of an outdoor foldable electric trailer according to claim 3, wherein the connecting rod locking assembly further comprises: a right first connecting rod, wherein the first end of the right first connecting rod is rotatably connected to an end of the main connecting rod adjacent to the switch spring, the tail end of the right first connecting rod is rotatably connected to a right second connecting rod, the middle part of the right second connecting rod is rotatably connected to the bottom surface of the first pedal, an end of the right second connecting rod away from the right first connecting rod is rotatably connected to a right latch rod, an end of the right latch rod away from the right second connecting rod penetrates the side wall of the first pedal, an end of the right latch rod penetrating the side wall of the first pedal is connected with a right push plate, and the right push plate is located in the bottom surface of the first pedal.

5. The manned folding pedal of an outdoor foldable electric trailer according to claim 2, wherein a retraction bayonet is arranged respectively on both sides of an end of the second pedal away from the first pedal, the end portion of the retraction bayonet penetrates the side wall of the second pedal, one end of the retraction bayonet located in the second pedal is connected to a bayonet spring, one end of the retraction bayonet provided with the bayonet spring is further connected to a toggle plate, and the toggle plate is spaced apart from the end connected to the retraction bayonet and the inner side wall of the second pedal.

6. The manned folding pedal of an outdoor foldable electric trailer according to claim 2, wherein the universal wheel assembly comprises: two universal wheels, wherein the two universal wheels are rotatably connected with the two rotating grooves one by one, a synchronization rod is fixedly connected between the two universal wheels, a first push-pull rod is rotatably connected in the middle of the synchronization rod, a push-pull chute is arranged in the middle of the bottom surface of the second pedal, an end of the first push-pull rod away from the synchronization rod is slidably connected with the push-pull chute, a linkage chute is arranged at one end where the first push-pull rod is connected to the push-pull chute, the bottom surface of one end where the first pedal is connected to the second pedal is rotatably connected with a second push-pull rod, and an end of the second push-pull rod far away from the first pedal is slidably connected with the linkage chute.

7. The manned folding pedal of an outdoor foldable electric trailer according to claim 1, wherein a limiting plate is arranged respectively on both sides of the second end of the folding frame provided with the folding pedal assembly, a first retractable limiting hole is formed on the top of the limiting plate, an unfoldable limiting hole is formed at the bottom of the limiting plate, the angle between the first retractable limiting hole and the unfoldable limiting hole is set to be 90°, and a second retractable limiting hole is further formed on the limiting plate.

* * * * *